(12) United States Patent
Gong

(10) Patent No.: US 10,699,147 B2
(45) Date of Patent: Jun. 30, 2020

(54) SYSTEMS AND METHODS FOR FAST IDENTIFICATION AND PROCESSING OF AN IMAGE AREA OF INTEREST

(71) Applicant: BITO Robotics, Inc., Pittsburgh, PA (US)

(72) Inventor: Chaohui Gong, Pittsburgh, PA (US)

(73) Assignee: BITO Robotics, Inc., Pittsburgh, PA (US)

( * ) Notice: Subject to any disclaimer, the term of this patent is extended or adjusted under 35 U.S.C. 154(b) by 202 days.

(21) Appl. No.: 16/001,015

(22) Filed: Jun. 6, 2018

(65) Prior Publication Data

US 2018/0373950 A1      Dec. 27, 2018

Related U.S. Application Data

(60) Provisional application No. 62/523,341, filed on Jun. 22, 2017.

(51) Int. Cl.
| | |
|---|---|
| G06K 9/00 | (2006.01) |
| G06K 9/32 | (2006.01) |
| G06T 7/13 | (2017.01) |
| G06K 7/14 | (2006.01) |
| G06T 7/11 | (2017.01) |
| G06K 9/20 | (2006.01) |
| G06T 7/73 | (2017.01) |
| G06T 7/00 | (2017.01) |

(52) U.S. Cl.
CPC ......... *G06K 9/3233* (2013.01); *G06K 7/1417* (2013.01); *G06K 9/2054* (2013.01); *G06T 7/11* (2017.01); *G06T 7/13* (2017.01); *G06T 7/73* (2017.01); *G06K 2009/3225* (2013.01); *G06T 2207/30204* (2013.01)

(58) Field of Classification Search
CPC .................................. G06K 9/00; G06T 7/00
See application file for complete search history.

(56) References Cited

U.S. PATENT DOCUMENTS

2014/0100693 A1      4/2014   Fong et al.
2016/0339587 A1 *   11/2016  Rublee .................. B25J 9/1697

OTHER PUBLICATIONS

Patent Cooperation Treaty, International Search Report and Written Opinion of the International Searching Authority, PCT/US18/38685, dated Sep. 17, 2018.

* cited by examiner

*Primary Examiner* — Abolfazl Tabatabai
(74) *Attorney, Agent, or Firm* — Jones Day

(57) ABSTRACT

Systems and methods are provided for a data acquisition system. An image capture device is configured to capture image data, where the captured image includes data associated with the image, where the pixel data includes visible light pixel data and non-visible light pixel data. A fiducial locator is configured to identify an area of interest of the image based on fiducials in the image detected through analysis of the non-visible light pixel data. An image processor is configured to extract data from the area of interest of the image based on the visible light pixel data while ignoring other portions of the image.

22 Claims, 14 Drawing Sheets

SYSTEMS AND METHODS FOR FAST IDENTIFICATION AND PROCESSING OF AN IMAGE AREA OF INTEREST

CROSS-REFERENCE TO RELATED APPLICATIONS

This application claims priority to U.S. Provisional Application No. 62/523,341, filed Jun. 22, 2017, entitled "Systems and Methods for Fast Identification and Processing of an Image Area of Interest," which is incorporated herein by reference in its entirety.

BACKGROUND

Developments in image capture technology continue to increase the amount of information (e.g., pixels) that can be captured per image. Increased resolution enables increased data capture. But this greater amount of pixel data requires more computing resources to process. As image processing application demands increase (e.g., processing more images in a shorter period of time), image processing can become a bottleneck. In some instances, only portions ("areas of interest") of an image contain data relevant to the image processing application. Focusing image processing on these areas of interest can alleviate processing bottlenecks.

SUMMARY

Systems and method are provided for a data acquisition system. An image capture device is configured to capture image data, where the captured image includes data associated with the image, where the pixel data includes visible light pixel data and non-visible light pixel data. A fiducial locator is configured to identify an area of interest of the image based on fiducials in the image detected through analysis of the non-visible light pixel data. An image processor is configured to extract data from the area of interest of the image based on the visible light pixel data while ignoring other portions of the image.

As another example, a method of extracting data includes capturing an image, where the captured image includes data associated with pixels of the image, where the pixel data includes visible light pixel data and non-visible light pixel data. An area of interest of the image is identified based on fiducials in the image detected through analysis of the non-visible light pixel data. Data is extracted from the area of interest of the image based on the visible light pixel data while ignoring other portions of the image.

As a further example, an autonomous vehicle includes an image capture device configured to capture data associated with pixels of an image of a location marker. A fiducial locator is configured to identify an area of interest of the image based on fiducials in the image. An image processor is configured to extract data from the area of interest of the image while ignoring other portions of the image, and a control system is configured move the autonomous vehicle based on a location command and the extracted data from the area of interest.

DETAILED DESCRIPTION

Figure 1:
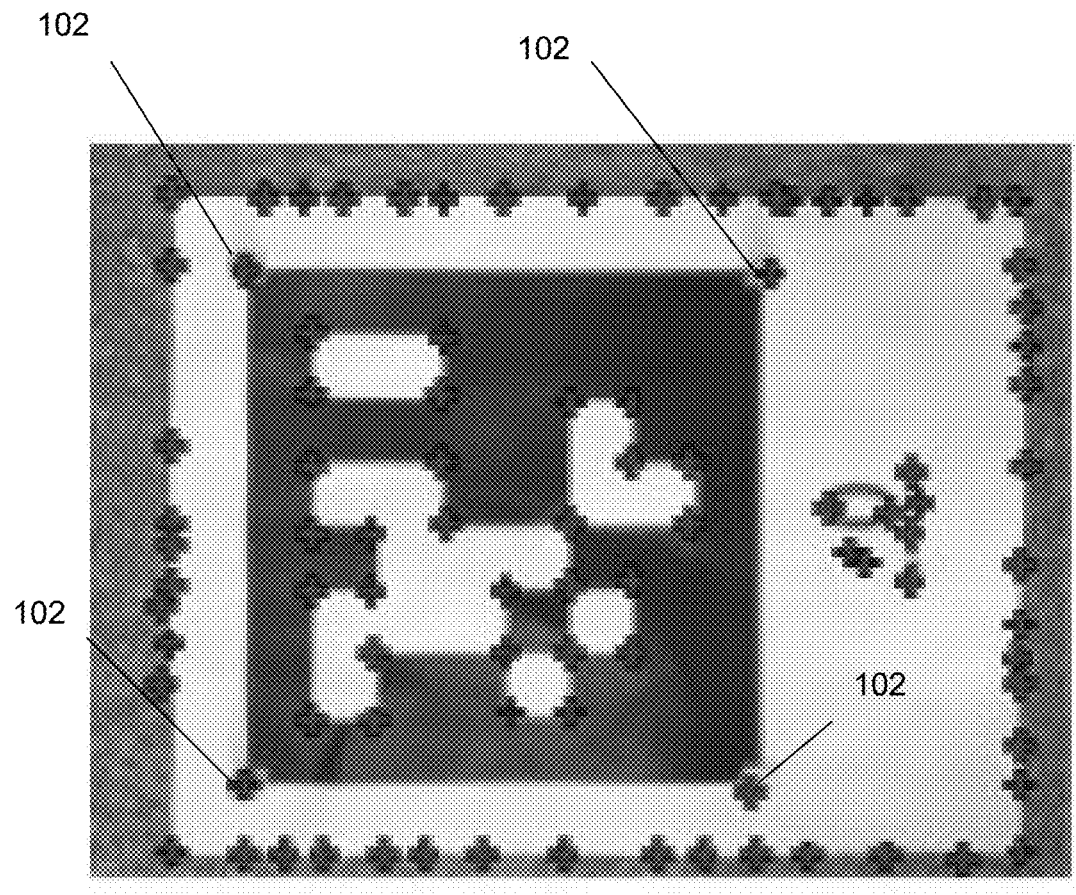
FIG. 1 is a diagram depicting an example corner/edge detection method, where an entire image is processed to identify corner features that could define candidate areas of interest

A wide variety of computer and robotics application require extraction of meaningful data from one or more images (e.g., computer vision for a robot, facial recognition software, motion capture). Typically, only a portion of an image being analyzed contains meaningful data to the application, where the remainder of the image is irrelevant or considered noise. While it is easy for a human to discern what data is relevant or irrelevant, that determination is more difficult for a computer. Image processing can perform data extraction in one of two ways. In a first method, the entire image is processed to identify and extract data. This first method can be very resource inefficient, where significant processing resources (e.g., time, processing cycles) are spent on areas of the image that do not contain relevant data. In a second method, a first pass over the image is performed to identify features (e.g., edges, corners) that may define an area of the image where meaningful data is contained. A second pass is then performed over the identified candidate area(s) of the image to extract any meaningful data therein. This second method can also be resource intensive, especially where the first pass over the image results in high numbers of false positive areas of interest. FIG. 1 is a diagram depicting an example of this second method, where an entire image is processed to identify features that could define candidate areas of interest. In actuality, only the four corners labeled 102 are the desired features that define the depicted tag.

Figure 2:
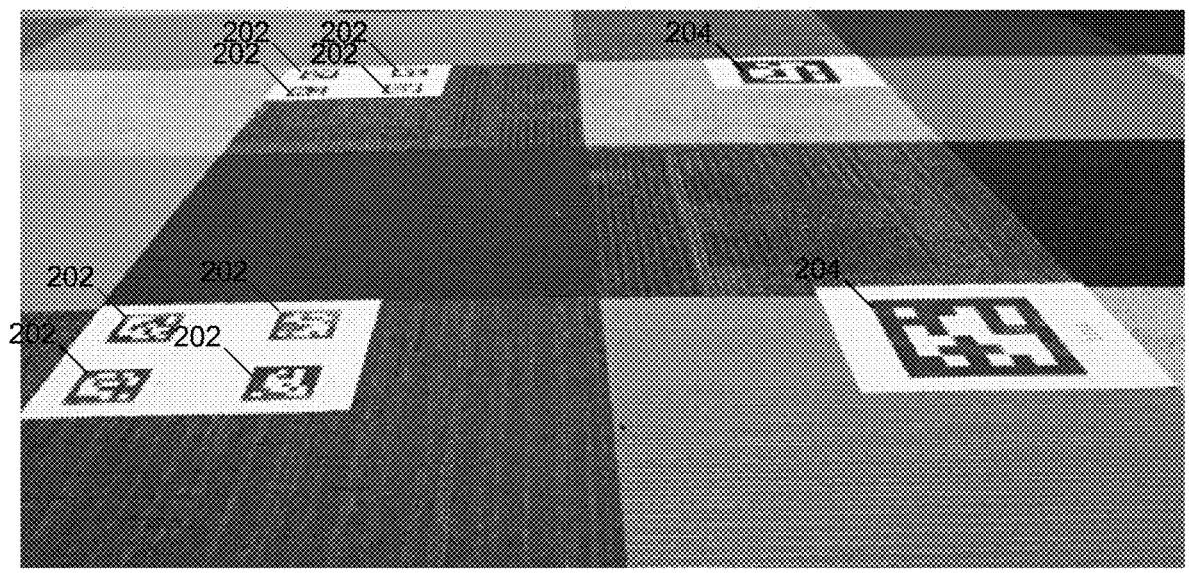
FIG. 2 is a diagram depicting an example image containing meaningful data.

FIG. 2 is a diagram depicting an example image containing meaningful data. In that example, eight small regions 202 and two large regions 204 contain tags (e.g., an AprilTag, a QR-tag), which provide encoding of a character(s) (e.g., a number, a character, a string). In an implementation where each encoded character is associated with a location, processing an image like the one depicted in FIG. 2 can enable determination of a current location of the image capture device based on the positions of the tags relative to each other and the point of view of the image. But, only a small portion of the image of FIG. 2 contains meaningful data (i.e., the tags). The remainder of the image depicts the floor, which does not aid in location determination. Processing the entire image of FIG. 2 to determine location could be sub-optimal. Thus, systems and methods as described herein provide fast identification of areas of interest so that image processing resources can be spent in an efficient manner.

Figure 3:
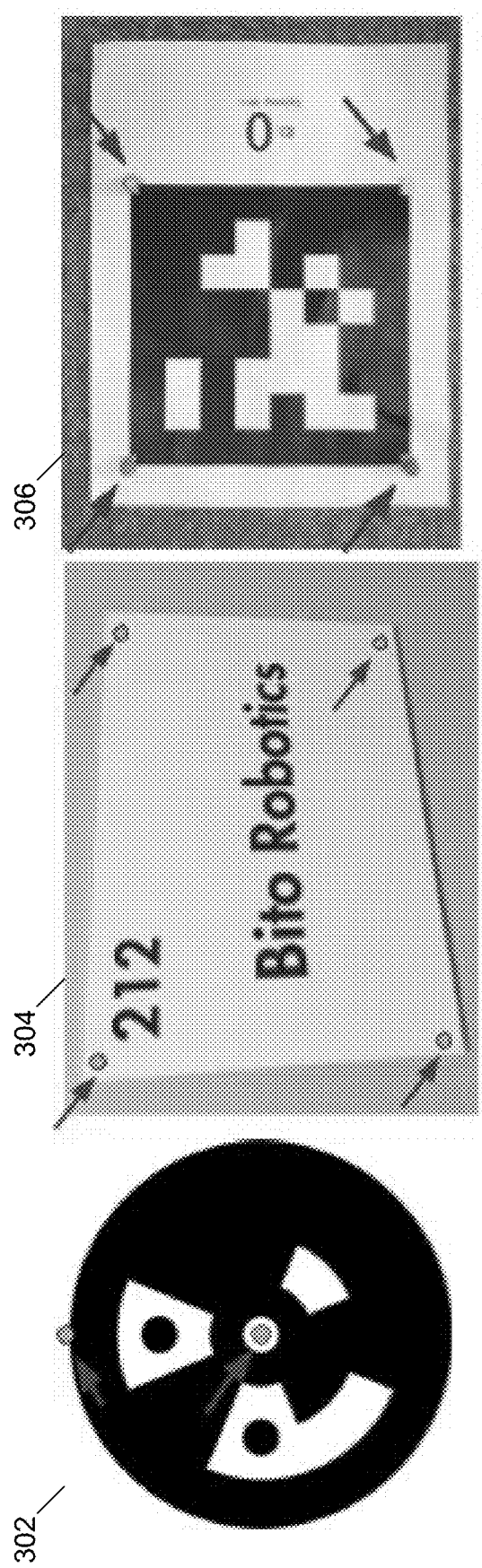
FIG. 3 is a diagram depicting example placement of fiducials on or near areas of interest in an image that contain meaningful data for targeted image processing.

Systems and methods as described herein utilize fiducial markers ("fiducials") that have characteristics that make them easily detectable. These fiducials are typically significantly different from their surroundings, such that the fiducials are seldom, if ever, falsely identified. This is in stark contrast to traditional edge or corner identification, which typically has high rates of false positives, as illustrated in FIG. 1. Example fiducials may be a specific color that is uncommon in its surroundings or may be reflective of certain bands of light that are outside of the visible spectrum (e.g., the infrared light band, the ultraviolet light band). FIG. 3 is a diagram depicting example placement of fiducials on or near areas of interest in an image that contain meaningful data for targeted image processing. The fiducials are positioned relative to one another and the data-containing area of interest. In example 302, a fiducial is placed at the top and at the center of a circle, where a circular area of interest can be defined based on detection of the location of those two fiducials. In example 304, fiducials are placed at the corner of a sign, where a rectangular area of interest can be defined based on detection of those four fiducials. In example 306, fiducials are placed at the corners of a tag, where a square area of interest can be defined based on detection of those four fiducials.

Figure 4:
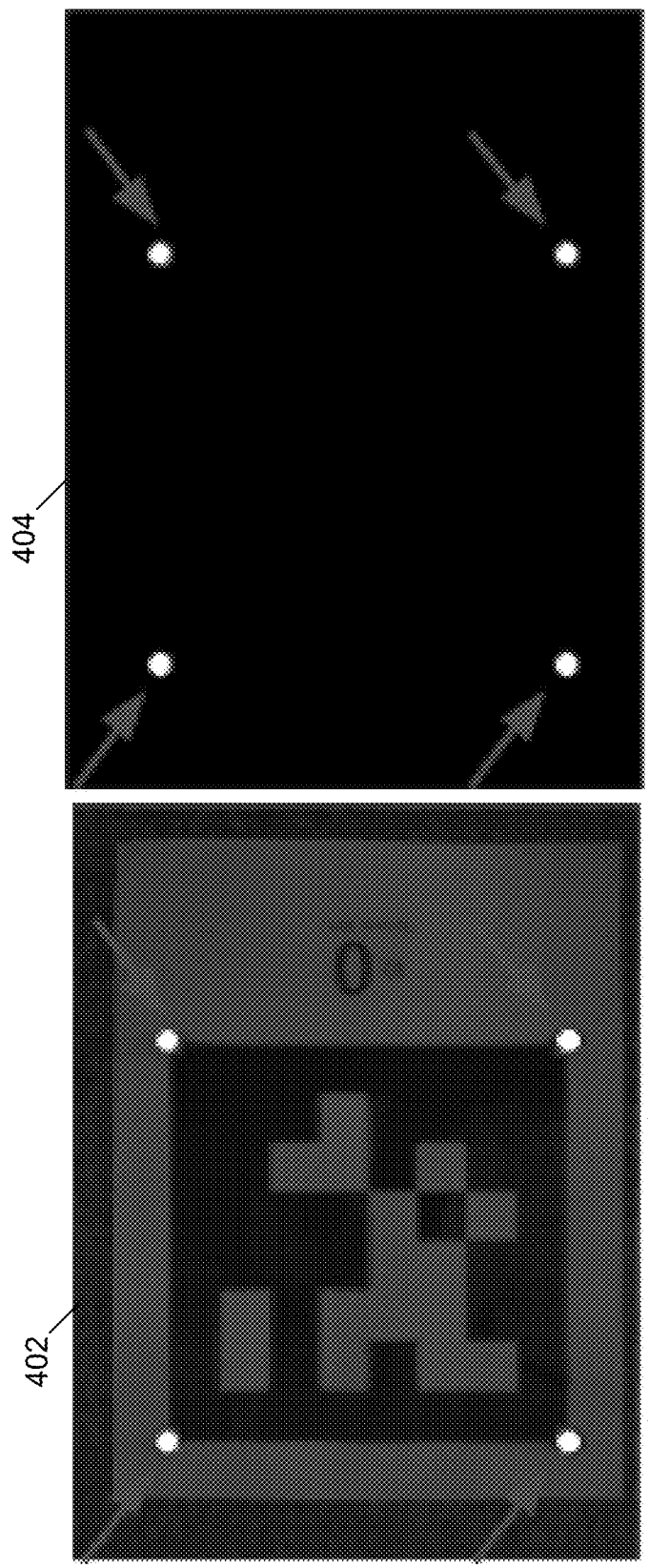
FIG. 4 depicts an example of detection of four fiducials to define a square area of interest associated with a tag.

FIG. 4 depicts an example of detection of the four fiducials of example 306 to define the square area of interest associated with the tag. In the example of FIG. 4, fiducials are placed at the corners of the tag that are reflective of infrared light, as indicated at 402. These fiducials may be applied to the tag in a variety of ways including drawing with a pen having IR-reflective ink, attachment of reflective material (e.g., using glue or other adhesive), or printing using a printer having one channel of IR-reflective ink. In one embodiment, data is extracted from an image using two different data acquisition channels. In the example of FIG. 4, a first channel is sensitive to light reflected in the IR-band. This first channel would sense the reflected IR-light at a small set of pixels, as depicted at 404. The center of each of those focused areas of returns is identified as a candidate fiducial. Relative positioning of the candidate fiducials is evaluated to find fiducials that have the predetermined spatial relationship. In this example, candidate fiducials are evaluated to find four fiducials that form a square. That square forms the area of interest or provides a basis for defining the area of interest (e.g., a smaller square within the candidate fiducial square) for image processing to extract meaningful data. In one example, that data extraction is performed using a different band (e.g., a visible light RGB-band) of light.

Figure 5:
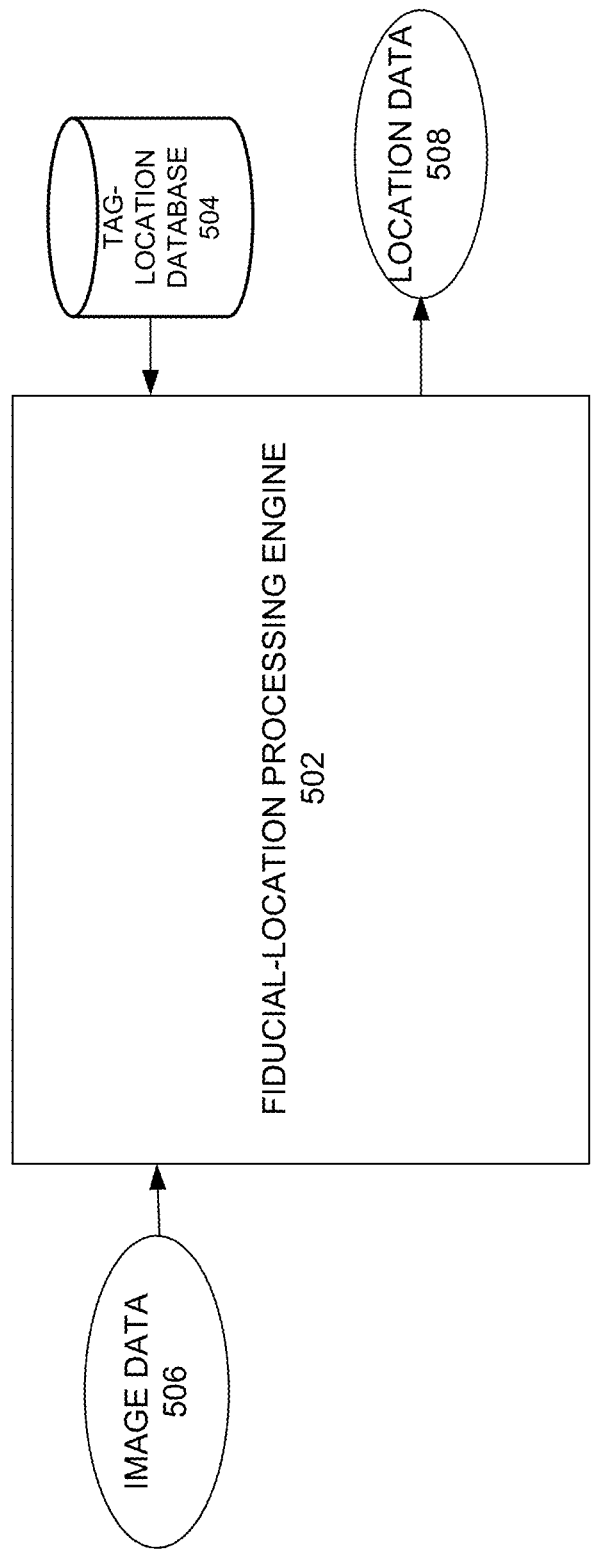
FIG. 5 is a block diagram depicting a fiducial-location processing engine for determining a location based on processed images.

FIG. 5 is a block diagram depicting a fiducial-location processing engine for determining a location based on processed images. The fiducial-location processing engine 502 is responsive to a tag-location database 504 that contains associations between tag characters (e.g., 'B6,' 'R10,' 'J80') and locations (e.g., GPS locations, particular locations in a factory or warehouse). Image data is received at 506. That image data 506 is processed to identify fiducials (e.g., using a UV-band) defining an area of interest and to extract tag characters (e.g., using an RGB-band) from within that area of interest. A lookup of the extracted tag characters is performed using the tag-location database 504 to determine a current location, where that location data 508 is output for use by an application (e.g., for controlling movement of a robot commanded to move to a particular location).

Figure 6:
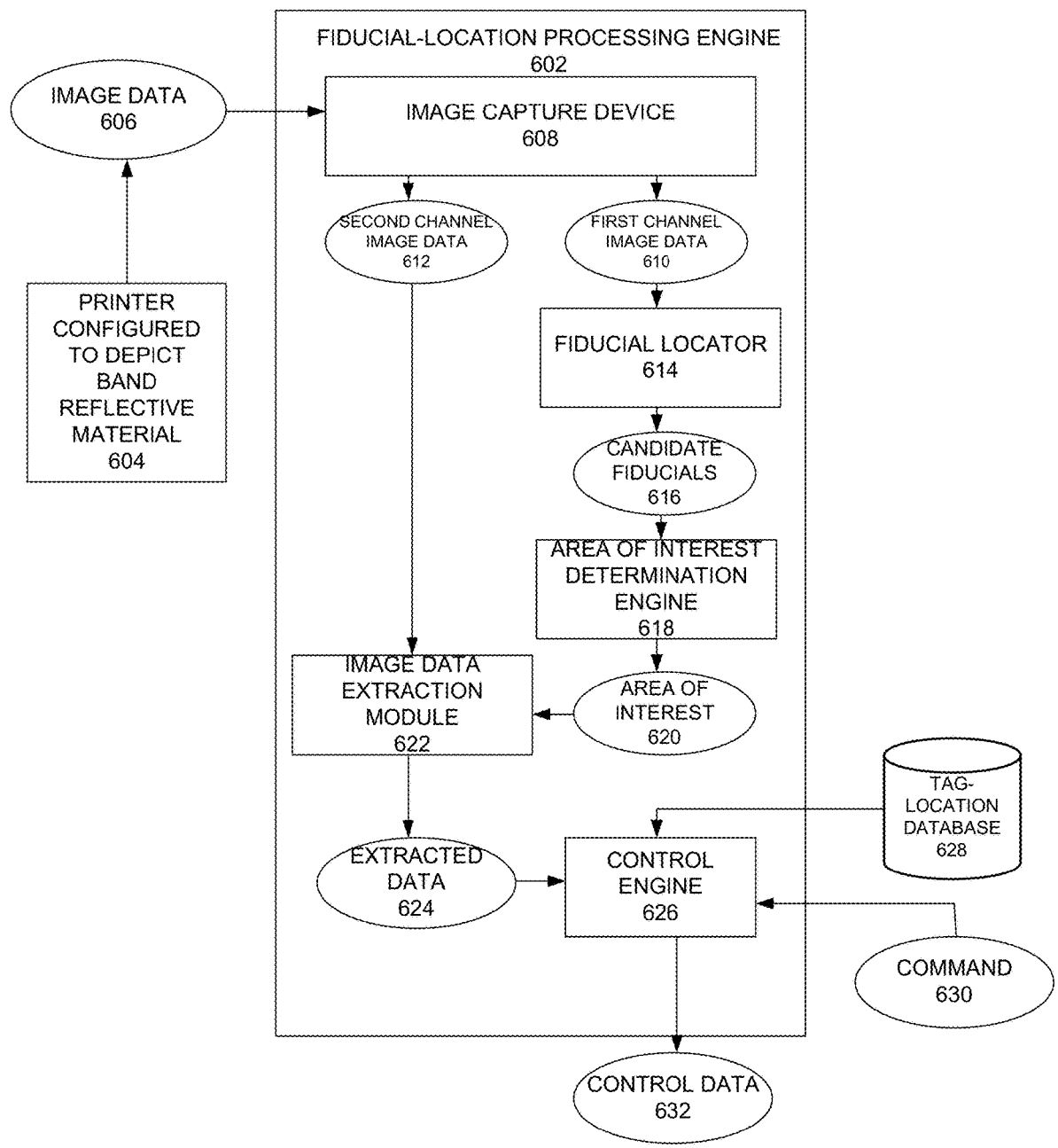
FIG. 6 is a diagram depicting an example control engine that operates based on fiducial location.

FIG. 6 is a diagram depicting an example fiducial-location processing engine. An environment contains tags or other data-containing entities that are associated with fiducials printed using a printer 604 configured to print material reflective of a particular light band. A fiducial-location processing engine 602 receives image data 606 that includes a data-containing region and associated fiducials captured via an image capture device 608 (e.g., a digital camera). The image capture device 608 separates the image data into first channel data 610 (e.g., an IR-band channel) and second channel data 612 (e.g., RGB-data). A fiducial locator 614 processes the first channel image data 610 to identify candidate fiducials 616 (e.g., by finding pixels or centers of groups of pixels having greater than threshold levels of detected light in the particular band (e.g., the IR-band)). Upon locating the candidate fiducials 616, an area of interest determination engine 618 determines one or more areas of interest 620 for further data extraction.

An area of interest 620 can be determined using fiducials in a number of ways. In one example, candidate fiducials are identified using the first channel (e.g., the UV-channel). The second channel (e.g., the RGB-channel) is then used to determine whether the pre-determined relationship exists between a subset of the candidate fiducials. In an example where the pre-determined relationship is a rectangle, a subset of four candidate fiducials is evaluated to determine whether a first edge exists between a first fiducial and a second fiducial; whether a second edge exists between the second fiducial and a third fiducial; whether a third edge exists between the third fiducial and a fourth fiducial; and whether a fourth edge exists between the fourth fiducial and the first fiducial. When those four edges are detected, characteristics of those edges may be evaluated to determine whether the four edges form a rectangle (e.g., whether the first and third edges are parallel; whether the second and fourth edges are parallel; angles between successive edges; ratios of lengths among the edges). When the edges are deemed to form an appropriate rectangle, an area of interest is defined based on that rectangle (e.g., within the rectangle, within a middle third of the rectangle).

Once the area of interest 620 has been identified, an image data extraction module 622 processes second channel image data 612 within that area of interest to extract data 624. That data 624 can then be utilized for an application. For example, where the fiducial-location processing engine 602 is associated with a robot, a control engine 626 utilizes a tag-location database 628 to determine a location of the robot based on the extracted data 624 (e.g., performing a lookup based on a string associated with a tag detected by the image data extraction module 622). The control engine 626, having received a command 630 to move the robot to a particular location, uses its knowledge of the current location of the robot to output control data (e.g., motor actuator signals) to control movement of the robot from its current location to the location indicated by the command 630.

Figure 7:
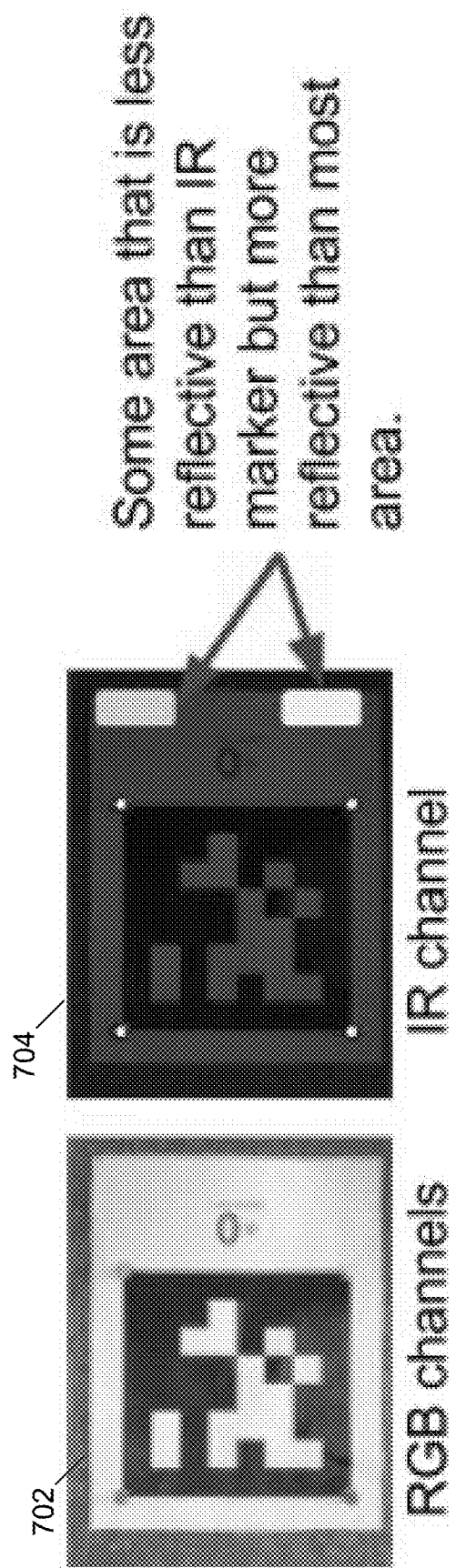
FIGS. 7-9 provide an example of identifying an area of interest in captured image data.
Figure 8:
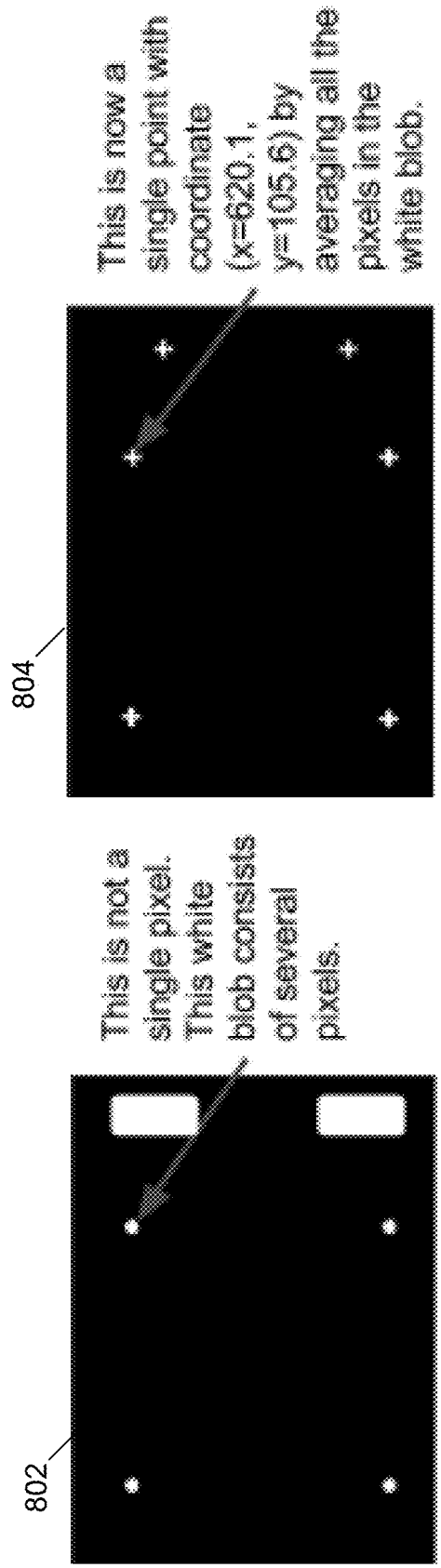
Figure 9:
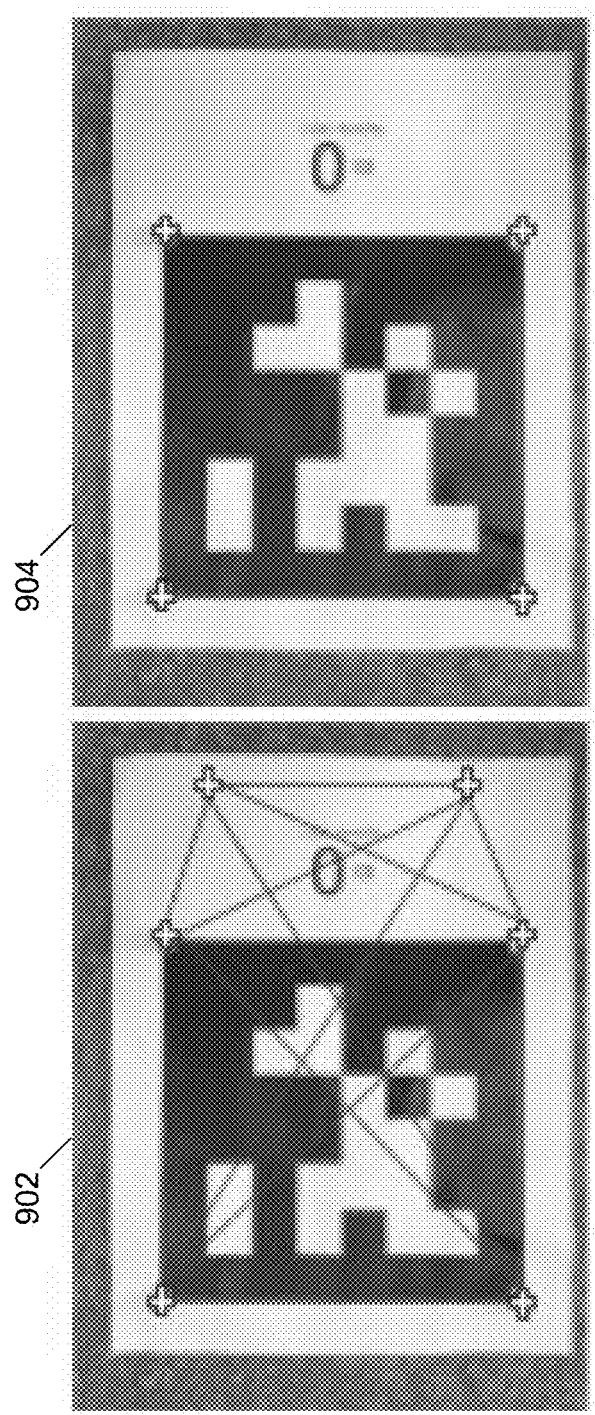

FIGS. 7-9 provide an example of identifying an area of interest in captured image data. FIG. 7 depicts image data captured via two channels. At 702, RGB data is depicted, while at 704 IR data is depicted. The IR data is utilized to identify candidate fiducials. As indicated in FIG. 7, six areas of the IR image are reflective of IR light, such that their pixels in the IR channel exceed a threshold level (e.g., a zero level, a threshold level greater than zero). In FIG. 8, the pixels having IR channel values greater than the threshold are indicated in white at 802. As noted in FIG. 8, the above-threshold pixels are actually groups of pixels. At 804, centers (e.g., centroids) of those groups of pixels are determined and indicated as candidate fiducials. In the example of FIG. 8, the six groups of above-threshold pixels are used to form six candidate fiducials. In FIG. 9, spatial relationships among subsets of four of the six candidate fiducials are evaluated at 902 (e.g., evaluating existences and characteristics of edges between the four fiducials of the subset) to identify one of those subsets that meets the pre-determined spatial relationship (i.e., a square). The four candidate fiducials that match that pre-determined spatial relationship are indicated at 904.

Area of interest image processing can be useful in a variety of contexts. For example, area of interest image processing can be used to track the fast movement of an actor for motion capture. There, small fiducial markers can be placed on portions of the actor's body (e.g., fingertips, head, legs, feet) to track movement of the associated body points.

Figure 10:
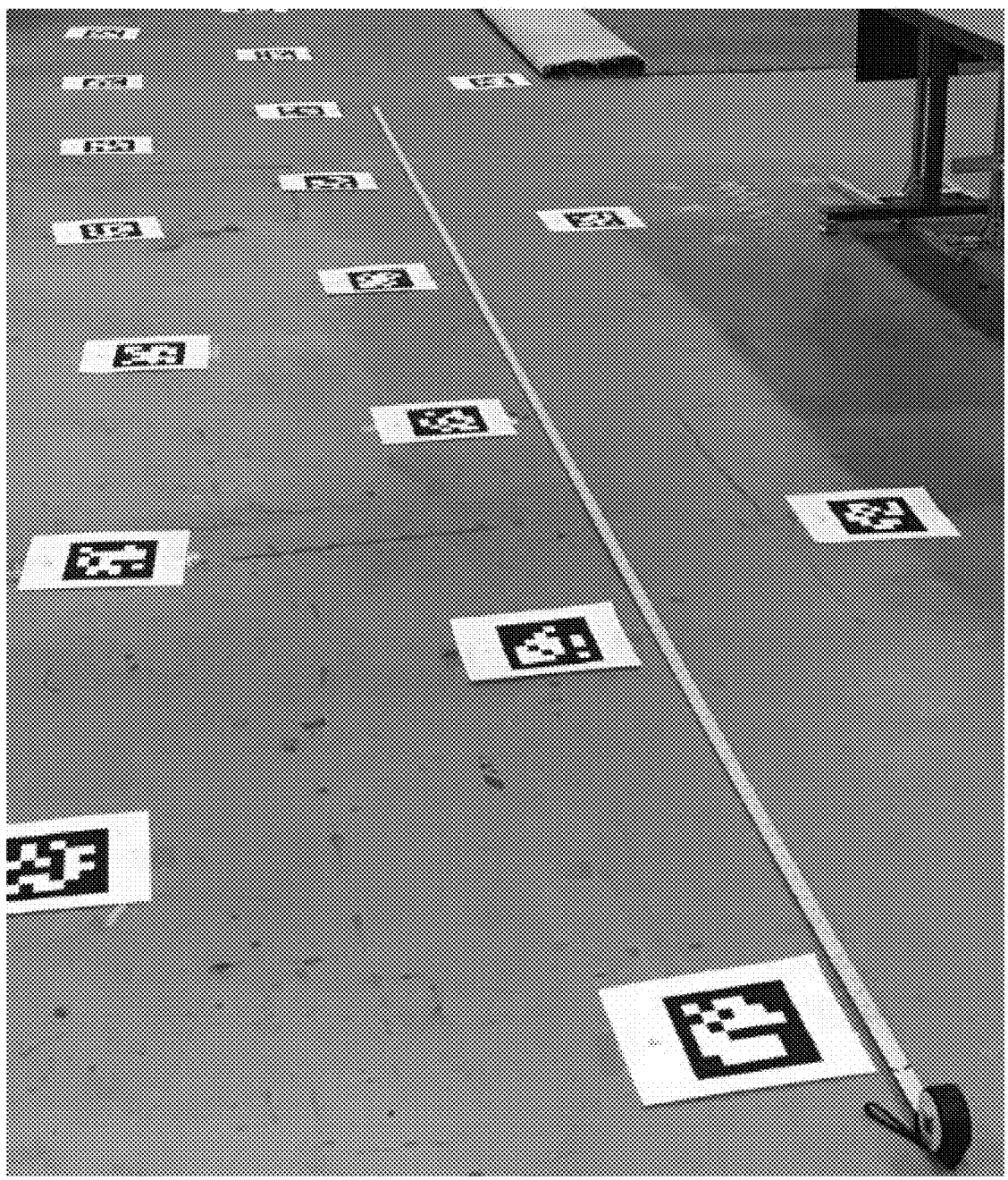
FIG. 10 is an image depicting the placement of location indicators in an environment.

In another example, an indoor localization system for mobile robots uses fiducial based-area of interest image processing. In one example, a tracking system must localize the robot within 0.05 m for safety while the robot is moving. A system that is able to process images at 100 Hz (e.g., based on fast processing enabled by fiducial area of interest determination) would allow the robot to move at 5 m/s (0.05 m*100 Hz). Such location control can be utilized to control an autonomous robot in an environment, such as a factory or a warehouse. By placing location indicators (e.g., AprilTags or QR-tags with fiducials) in the environment, the robot can move to precise locations (e.g., to fetch an object from a shelf or a pallet in a warehouse or factory; to perform a task in a hazardous environment) at a high rate of speed. FIG. 10 is an image depicting the placement of location indicators in an environment. A robot can move within that environment and determine its location in the environment based on information that it detects from the tags (e.g., from a downward facing camera, from an upward facing camera, from multiple cameras). Fiducials on the tags enable fast processing of captured images by focusing data extraction processing on areas of the image that contain relevant data, while ignoring other areas of the captured image.

Figure 11:
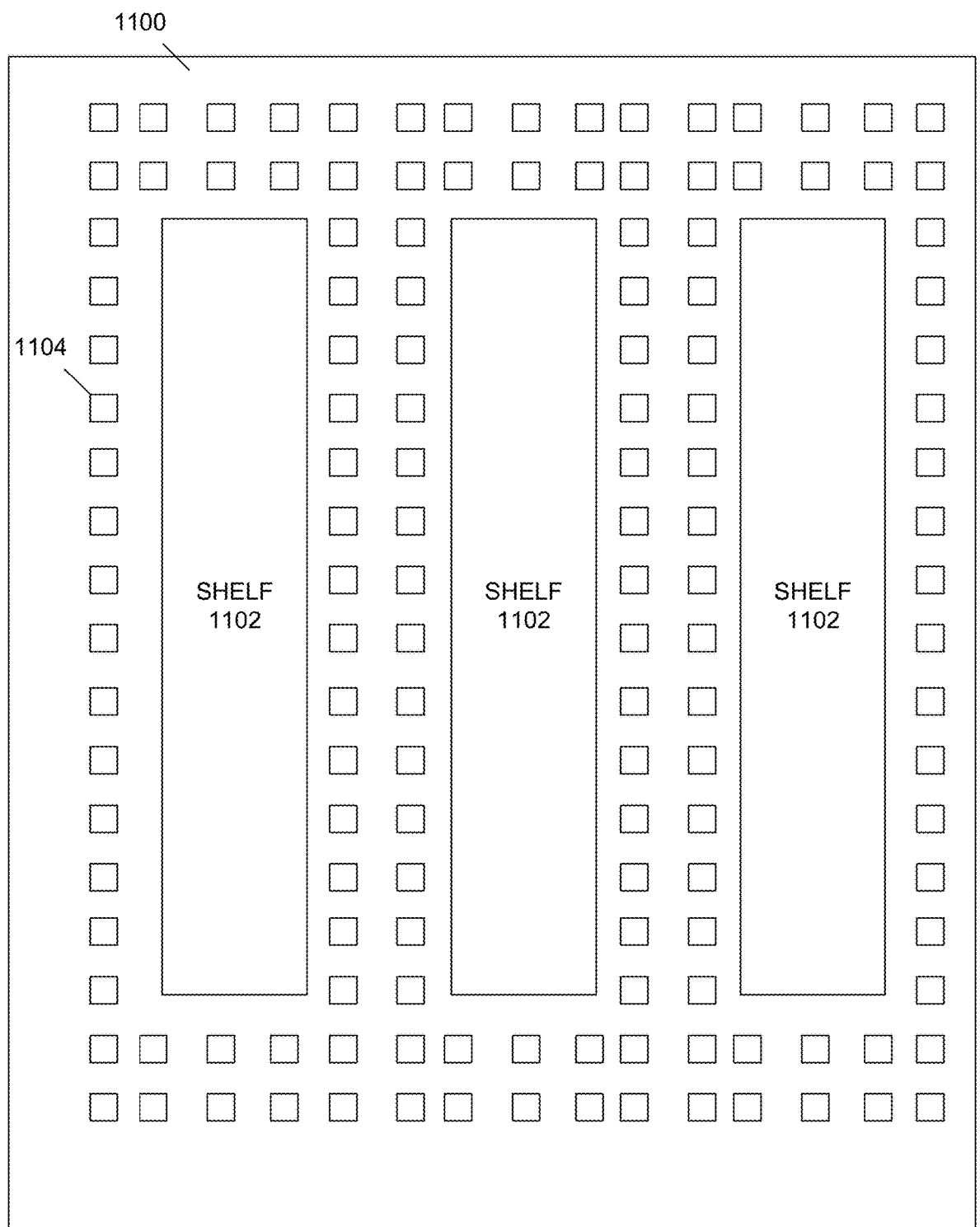
FIG. 11 is a diagram depicting an example warehouse environment.

FIG. 11 is a diagram depicting an example warehouse environment 1100. The warehouse 1100 contains three shelves 1102, where each of the shelves 1102 contains inventory for distribution at specific locations on the shelves 1102. An operator of the distribution warehouse 1100 seeks to fill orders in as fast a manner as possible using autonomous robots (e.g., autonomous robots that move up to or faster than 3 m/s). The autonomous robots utilize location-indicating tags (e.g., tag 1104) positioned throughout the warehouse environment 1100. Each of the tags 1104 is associated with one or more characters, where a tag-location database 1106 further associates those characters with a particular location within the warehouse 1100. The autonomous robot detects the characters of one or more nearby location-indicating tags and determines its location using the association data in the database 1106.

Figure 12:
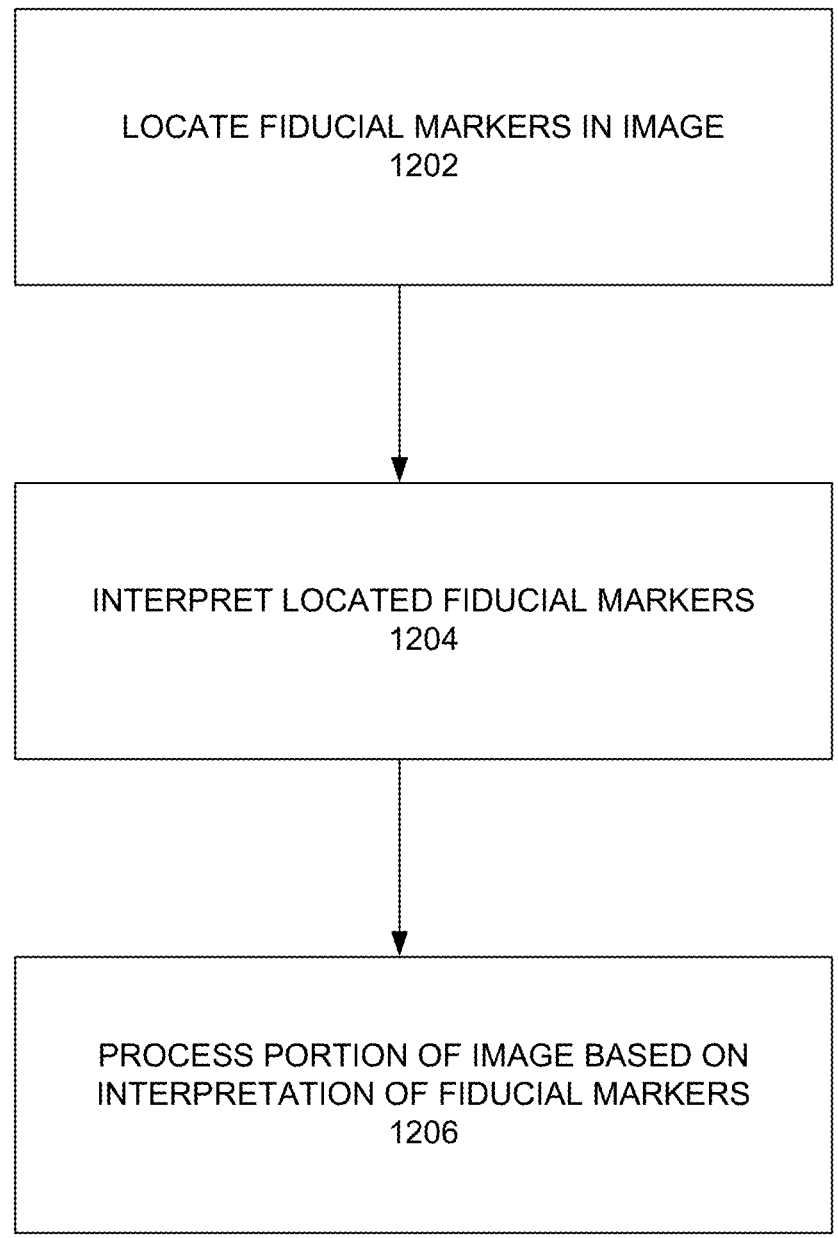
FIGS. 12-14 depict flow diagrams for methods of extracting data.

FIG. 12 is a flow diagram depicting a method of extracting data. The method includes capturing an image, where the captured image includes data associated with pixels of the image, where the pixel data includes visible light pixel data and non-visible light pixel data. Fiducial markers are located in the image at 1202. An area of interest of the image is identified based on fiducials in the image detected through analysis of the non-visible light pixel data at 1204. Data is extracted from the area of interest of the image at 1206 based on the visible light pixel data while ignoring other portions of the image.

Figure 13:
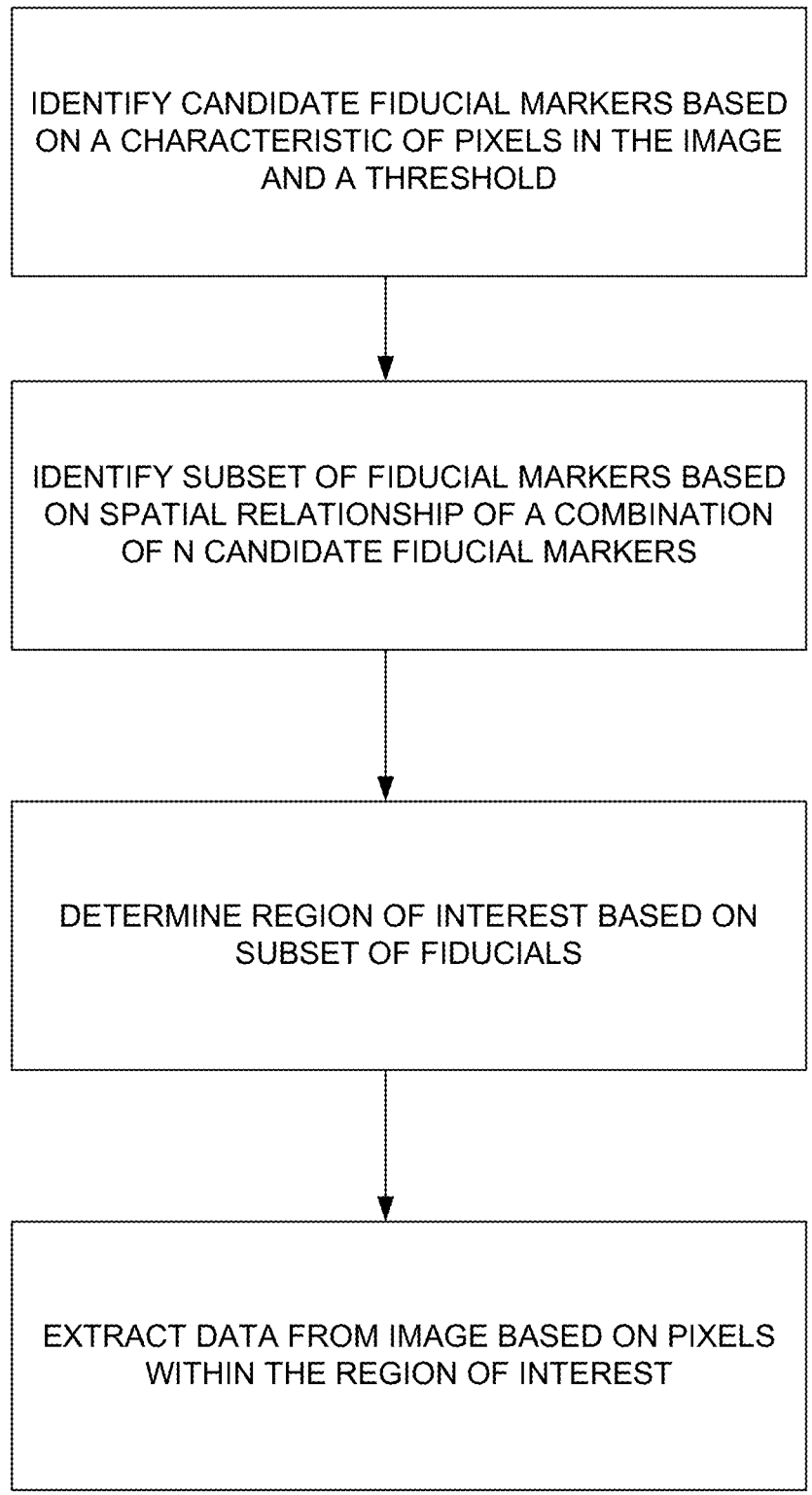

FIG. 13 is flow diagram depicting another method of extracting data. Candidate fiducial markers are identified at 1302 based on a characteristic of pixels in an image and a threshold. At 1304, a subset of the fiducial markers is identified based on a spatial relationship of a combination of n fiducial markers. At 1306, a region of interest is determined based on the subset of fiducials, and at 1308, data is extracted from the image based on pixels within the region of interest.

Figure 14:
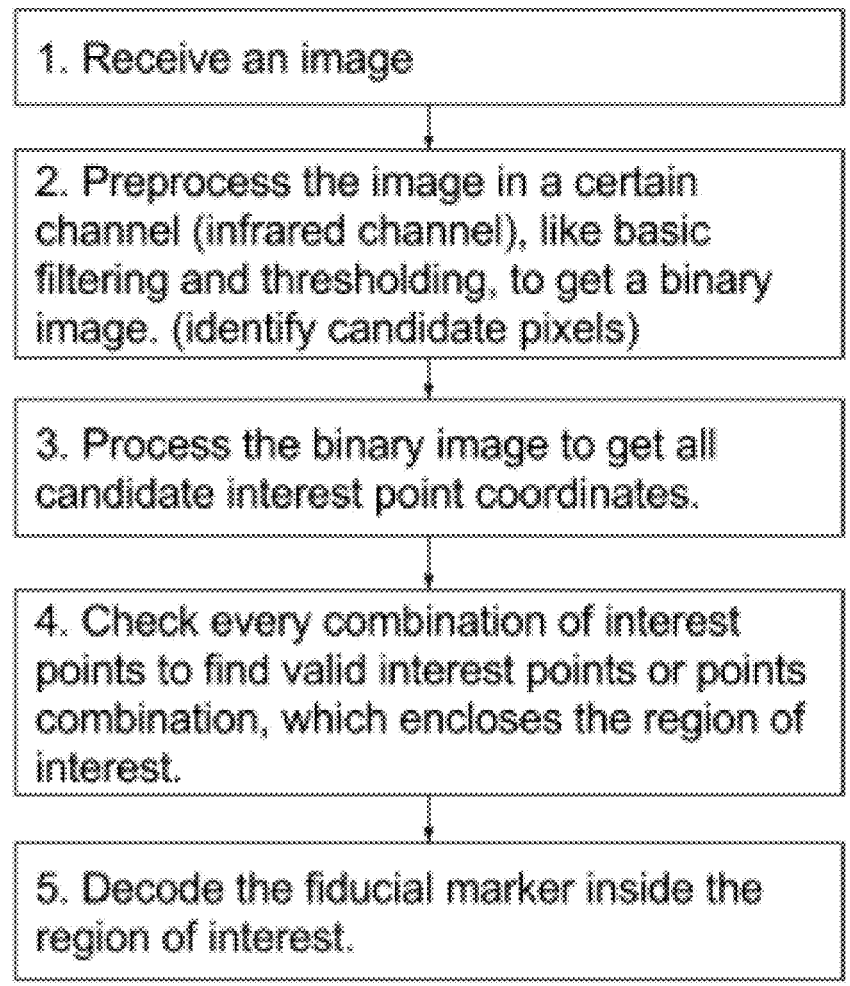

FIG. 14 is a flow diagram depicting a further process for extracting data. An image is received at 1402. The image is preprocessed at 1404 in a certain channel (e.g., an IR channel) to form a binary image (e.g., based on an IR-level threshold). The binary image is processed at 1406 to identify candidate fiducial interest point coordinates. At 1408, each combination of fiducial interest points is evaluated to find valid combinations that enclose a region of interest. At 1410, a fiducial marker inside the region of interest is decoded.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

It is claimed:

1. A data acquisition system, comprising:
   an image capture device configured to capture image data, wherein the captured image includes data associated with the image, wherein the pixel data includes visible light pixel data and non-visible light pixel data;
   a fiducial locator configured to identify an area of interest of the image based on fiducials in the image detected through analysis of the non-visible light pixel data; and
   an image processor configured to extract data from the area of interest of the image based on the visible light pixel data while ignoring other portions of the image.

2. The system of claim 1, further comprising:
   a location determination module configured to identify a location based on the extracted data from the area of interest and data from a non-transitory data store.

3. The system of claim 1, wherein the location marker is a tag;
   wherein the data store contains data associated with relationships between tags and locations of those tags.

4. The system of claim 3, wherein the tag is a QR-tag or an AprilTag.

5. The system of claim 1, wherein the fiducial locator is configured to process pixel data associated with a particular band of frequencies;
   wherein the fiducial locator identifies pixels in the image where light in the particular band is reflected from the location marker at greater than a threshold level as candidate fiducials.

6. The system of claim 5, wherein the particular band of frequencies is outside of a visible light band.

7. The system of claim 5, wherein the particular band is an infrared band or an ultraviolet band, and wherein the location marker includes a plurality of portions that are reflective of infrared light or ultraviolet light.

8. The system of claim 5, wherein the fiducial locator is configured to identify the area of interest by:
   evaluating spatial relationships among the candidate fiducials to identify a subset of candidate fiducials that have a predefined spatial relationship.

9. The system of claim 8, wherein the area of interest is identified based on locations of fiducials in the subset of fiducials.

10. The system of claim 8, wherein said evaluating comprises:
    detecting whether a first edge exists between a first fiducial and a second fiducial;
    detecting whether a second edge exists between the second fiducial and a third fiducial;
    detecting whether a third edge exists between the third fiducial and a fourth fiducial;
    detecting whether a fourth edge exists between the fourth fiducial and the first fiducial; and
    when the first, second, third, and fourth edges exist, identifying the area of interest as the area within a closed area formed by the first, second, third, and fourth edges.

11. The system of claim 8, wherein the predefined spatial relationship is one of:
    one candidate fiducial substantially above another candidate fiducial;
    one candidate fiducial substantially next to another candidate fiducial;
    four candidate fiducials forming a square;
    four candidate fiducials forming a rectangular having a particular height/width ratio.

12. The system of claim 5, wherein the image processor is configured to extract data using pixel data associated with frequencies outside of the particular band of frequencies.

13. The system of claim 5, wherein the image processor is configured to extract data using pixel data associated with a visible light band.

14. The system of claim 1, wherein the image processor is configured to process the data from the area of interest to decode a number, letter, or string represented on the marker.

15. method of extracting data, comprising:
    capturing an image, wherein the captured image includes data associated with pixels of the image, wherein the pixel data includes visible light pixel data and non-visible light pixel data;
    identifying an area of interest of the image based on fiducials in the image detected through analysis of the non-visible light pixel data; and
    extracting data from the area of interest of the image based on the visible light pixel data while ignoring other portions of the image.

16. The method of claim 15, further comprising:
    printing a tag depicted in the image, wherein printing the tag includes printing a material that is reflective of light outside of a visible light band at a plurality of points on the tag.

17. The method of claim 15, wherein the non-visible light pixel data is associated with an infrared band, and wherein the image is of an object that includes a plurality of portions that are reflective of infrared light.

18. The method of claim 15, wherein identifying the area of interest includes:
    identifying pixels in the image where light outside of a visible light band is reflected at greater than a threshold level as candidate fiducials; and
    evaluating spatial relationships among the candidate fiducials to identify a subset of fiducials that have a predefined spatial relationship.
    wherein the area of interest is identified based on locations of fiducials in the subset of fiducials.

19. The method of claim 18, wherein the area of interest is identified based on locations of fiducials in the subset of fiducials.

20. An autonomous vehicle, comprising:
    an image capture device configured to capture data associated with pixels of an image of a location marker;
    a fiducial locator configured to identify an area of interest of the image based on fiducials in the image;
    an image processor configured to extract data from the area of interest of the image while ignoring other portions of the image; and
    a control system configured move the autonomous vehicle based on a location command and the extracted data from the area of interest.

21. The vehicle of claim 20, wherein the vehicle is configured to move a shelf or a pallet in a warehouse or factory.

22. The vehicle of claim 20, wherein the vehicle is configured to access an item from a shelf or a pallet in a warehouse or a factory.

* * * * *